United States Patent

Asami et al.

[11] Patent Number: 5,906,712
[45] Date of Patent: May 25, 1999

[54] PRODUCTION OF FIBER REINFORCED COMPOSITE

[75] Inventors: Keiichi Asami; Kiyotaka Nakanishi; Hideki Takahashi, all of Uji; Ritsuko Shidei, Fushimi-ku; Azusa Yamagata; Yoshiaki Echigo, both of Uji, all of Japan

[73] Assignee: Unitika Ltd., Japan

[21] Appl. No.: 08/262,370

[22] Filed: Jun. 20, 1994

Related U.S. Application Data

[63] Continuation-in-part of application No. 07/954,494, Sep. 23, 1992, abandoned, which is a continuation-in-part of application No. 07/802,566, Dec. 5, 1991, abandoned.

[30] Foreign Application Priority Data

Dec. 5, 1990 [JP] Japan ................................. 2-406299
Feb. 27, 1991 [JP] Japan ................................. 3-058326

[51] Int. Cl.$^6$ ........................................ D21H 13/36
[52] U.S. Cl. ...................... 162/156; 162/145; 162/146; 162/157.1; 162/158; 162/164.1; 162/164.3; 162/168.1; 162/168.2; 162/168.3; 162/169; 162/183
[58] Field of Search ................ 162/145, 164.1, 162/168.2, 168.3, 146, 183, 164.3, 169, 158, 168.1

[56] References Cited

U.S. PATENT DOCUMENTS 2,786,759  3/1957  Feigley ........................................ 162/169
3,119,731  1/1964  Strole et al. .................................. 162/169

FOREIGN PATENT DOCUMENTS 300909  1/1989  European Pat. Off. ............... 162/145

*Primary Examiner*—Peter Chin
*Attorney, Agent, or Firm*—Wenderoth, Lind & Ponack, L.L.P.

[57] ABSTRACT

The present invention provides a process for producing a fiber reinforced composite which contains the reinforcing fibers uniformly dispersed therein and therefore has uniformity of strength. The process comprises;

preparing an aqueous slurry which comprises reinforcing fibers, water-soluble organic polymers A charged in water and particulate organic polymers, adding thereto water-soluble organic polymers B charged opposite to said organic polymers A in water to flocculate the solid components in said aqueous slurry, and then removing aqueous medium and molding.

7 Claims, No Drawings

PRODUCTION OF FIBER REINFORCED COMPOSITE

This application is a continuation-in-part of application Ser. No. 07/954,494, filed Sep. 23, 1992, which in turn is a continuation-in-part of application Ser. No. 07/802,566, filed Dec. 5, 1991, both applications being now abandoned.

FIELD OF THE INVENTION

The present invention relates to a process for producing a fiber reinforced composite which contains uniformly dispersed reinforcing fibers and exhibits excellent strength.

BACKGROUND OF THE INVENTION

Hitherto, fiber reinforced composites are generally produced by a handlay up method wherein reinforcing fibers are saturated with a resin to form a resin-saturated fiber mat, which is then shaped at an elevated temperature and an elevated pressure.

Japanese Kokai Publication 61-211343 U.S. Pat. No. 4,654,100) proposes a simplified process wherein an aqueous slurry is prepared by dispersing reinforcing fibers, particulate solid thermosetting polymers, curing agent and a latex binder in water, and then mixed with a polymer flocculating agent to flocculate the solid components, which are then dried and pressed at an elevated temperature. Since the latex binder has an electric charge in water, it is difficult to uniformly disperse it with the reinforcing fibers and particulate solid thermosetting polymers upon flocculating. The obtained article from this composite, therefore, does not have strength uniformity, because of the nonuniformity of the components.

Also, Japanese Kokoku Publication 1-20644 U.S. Pat. No. 4,426,470) proposes a process for producing a fiber reinforced composite wherein particulate thermoplastic resins are employed. The process, however, also employs a latex binder and has the same disadvantage as mentioned above.

SUMMARY Of THE INVENTION

The present invention provides a process for producing a fiber reinforced composite which contains the reinforcing fibers uniformly dispersed therein and therefore has uniformity of strength. The process does not employ the latex binder which causes the above mentioned disadvantage. The process comprises;

preparing an aqueous slurry which comprises reinforcing fibers, water-soluble organic polymers A as dispering agents charged in water and particulate organic polymers, adding thereto water-soluble organic polymers B as flocculation agent charged opposite to said organic polymers A in water to flocculate the solid components in said aqueous slurry, and then removing the aqueous medium and molding.

DETAILED DESCRIPTION OP THE PREFERRED EMBODIMENT(S)

According to the present invention, an aqueous slurry is prepared from the reinforcing fibers, the water-soluble organic polymers A charged in water and the particulate organic polymers. To the resulting aqueous slurry, the water-soluble organic polymers n which are charged opposite to the organic polymers A in water are added to make the solid components unstable in the slurry to flocculate them, followed by removing the aqueous medium and molding. The flocculation may be conducted on a screen in a wet type laminating apparatus, such as a sheet mold or another continuous wet type laminating apparatus, and the dewatering and drying can be carried out thereon. Drying is preferably carried out in such a condition that the particulate organic polymers are not completely melted. The drying can include natural drying, high temperature drying, vacuum drying, a combination thereof and the like. The sheet after drying is shaped to a desired shape.

The reinforcing fibers employed in the present invention include inorganic fibers, such as glass fibers, carbon fibers, metal fibers and metal-covered glass or carbon fibers; polyester fibers, such as polyethylene terephthalate and polybutylane terephthalate; polyamide fibers, such as Nylon 6, Nylon 66 and Nylon 12; polyolefin fibers, such as polyethylene and polypropylene; synthetic pulp; cellulose; heat-fusable fibers, prepared by coating polyester fibers or polyamide fibers etc. with a polymer having a low melting point (egg. polyolefin); and the like. Preferred are glass fibers, carbon fibers and heat fusable fibers. The fibers can be combined with the other fibers if necessary. It is preferred that the fibers have an average length of 0.1 to 50 mm, preferably 3 to 24. If it is less than 0.1 mm, the resulting article has poor strength. If it is more than 50 nm, the fibers are not uniformly dispersed in the composite. It is also preferred that the fibers have an aspect ratio of fiber length/fiber diameter of at least 40, preferably 200 to 2000. Aspect ratios of less than 40 provide poor strength. From the above mentioned points, it is more preferred that the fibers have an average fiber length or 3 to 24 mm and a fiber diameter of 13 to 25 micrometer. An amount of the fibers in the composite can be varied, but preferably 10 to 90% by weight, preferably 20 to 70% by weight, based on the weight of the composite. Amounts of less than 10% by weight reduce strength and those of more than 90% by weight reduce a resin content and lower the adhesive ability between the fibers and the resin.

The water-soluble organic polymers A and B employed in the present invention can be natural or synthetic polymers and preferably have film-forming ability at room temperature (40° C.) or less. In a specific embodiment, it is preferred that the polymers A and B be film-forming at a temperature in the wet type laminating sheet forming process. The polymers A and B are selected from either polymers charged minus in water, such as partially hydrolyzed polyacrylamide, poly(sodium acrylate), partially hydrolyzed polyacrylonitrile; or polymers charged plus in water, such as modified cationic polyacrylamide, dialkylaminoethyl methacrylate polymer, vinylimidazoline polymer, diarylamine polymer and the like. If the polymers A are the minus charging polymer, the polymers B are the others.

The polymers A may be present in the composite in an amount of 0.1 to 10% by weight based on the weight or the composite. If it is less than 0.1% by weight, the obtained composite has poor strength. If it is more than 10% by weight, an amount of the organic polymers B increases. The organic polymers B of the present invention preferably have a molecular weight of not more than 5,000. Molecular weights of more than 5,000 prevent the fiber reinforcing fibers and the particulate organic polymers from uniform flocculation.

The particulate organic polymers used in the present invention may have a particle size of 10 to 300 micrometer, preferably 30 to 100 micrometer. Particle sizes of less than 10 micrometer often give rise to secondary agglomeration and those of more than 300 micrometer reduce dispersibility in an aqueous medium. The particulate polymers can be any type, for example thermoplastic resins, such as polyolefin (e.g. polyethylene and polypropylene), polyester (e.g. polyethylene terephthalate, polybutylene terephthalate), polyamide (e.g. Nylon 6, Nylon 6,6), polysulfone, polyethersulfone, polyether imide, polyether Ketone and the like; thermosetting resins, such as self-curable phenol resin, polyimide resin and the like. The particulate organic polymers further can be electroconductive polymers which preferably have an electroconductivity of $10^{-2}$ S/cm or more in the conditions of doped. Typical examples of the electroconductive polymers are polyacetylene, polyaniline, polypyrrole, polyazulene, polyphenylene, polyacene, polyphthalocyanine, poly-3-methylthiophene, polypyridine, polydiphenylbenzidine, derivatives thereof and the like. Preferred are polyacene, polyaniline and polypyrrole, in view of stability to oxidation. The particulate organic polymers may be contained in the aqueous slurry in an amount of 10 to 90% by weight based on the resulting fiber reinforced composite. Amounts outside of this weight range reduce the composite's strength.

The aqueous slurry thus obtained may further contain a latex which is electrically neutral and has no charge. The latex has a function to strongly bind the solid components, upon flocculating the solid components. The latex includes an acrylic polymer latex which is obtained by emulsion polymerization, The latex may preferably be present in an amount of 0.1 to 10% by weight based on the obtained composite. Amounts outside of this range reduce the composite's strength.

In addition to the above components, the aqueous slurry may contain an inorganic filler, such as $CaCO_3$, MgO, $Mg(OH)_2$, $CaSiO_2$, mica, ferrite powder (e.g. magnetite, gamma-iron oxide, barium ferrite and strontium ferrite). Other additives, such as pigment, dye, ultraviolet stabilizer, antioxidant, foaming agent, defoamer, bactericide, electromagnetic wave absorbent and the like may be added thereto.

The organic polymers B having a charge opposite to the polymers A in water are added to the aqueous slurry in an amount of 0.1 to 10% by weight based on the weight of the composite to flocculate the solid components in the slurry. Amounts of less than 0.1% by Weight do not perfect the flocculation and those of more than 10% by weight increase viscosity so high that the fibers and particulate polymers are mixed nonuniformly.

The aqueous slurry may be prepared by dispersing the reinforcing fibers, the particulate organic polymers and optionally the neutral latex and the other additives with the organic polymers A, as dispersing agents in water to form an aqueous slurry, to which the polymers B charged opposite to the polymers A in water are added to flocculate the aqueous slurry. The flocculated slurry is collected in the form of a mat, dried and molded.

In the case where the particulate organic polymers are thermoplastic, it is preferred that the molding be conducted at a temperature of 80 to 400° C., preferably 150 to 300° C. and a pressure of 20 to 1,000 Kg/cm², preferably 50 to 400 Kg/cm². It is then pressed at an elevated temperature, and cooled. If the molding is conducted at a temperature of less than 80° C. and a pressure of less than 20 Kg/cm², the obtained article has poor strength, If the molding is conducted at a temperature of more than 400° C. and a pressure of more than 1,000 Kg/cm² the obtained article is expensive.

In the case where the particulate organic polymers are thermosetting, it is preferred that the molding be conducted at a temperature of 100 to 400° C., preferably 150 to 300° C. and a pressure of 20 to 1,000 Kg/cm², preferably 50 to 400 kg/cm² for 5 to 60 minutes, preferably 10 to 40 minutes. if the molding is conducted at a temperature of less than 100° C. and a pressure of less than 20 Kg/cm² for less than 5 minutes, the obtained article has poor strength. If it is conducted at a temperature of more than 400° C. and a pressure of more than 1,000 Kg/cm² for more than 60 minutes, the obtained article is expensive.

EXAMPLES

The present invention is illustrated by the Examples which, however, are not to be construed as limiting the present invention to their details.

EXAMPLE 1

An aqueous slurry was prepared by dispersing 4 g of chopped glass fibers having an average length of 6 mm (UPDE-1/4-ZA508 available from Unitika UM Glass Co., Ltd.), 0.1 g of water-soluble organic polymers charged minus in water (UP-313 available from Unitika Ltd.) and 4 g of polyethylene particles (PE-COMP 1407 available from Toyo Ink Mfg Co., Ltd.) in 10 liter of water. The slurry was flocculated with a dilute, plus charged aqueous solution containing 0.1 g(in 30 g water) of water soluble organic polymer(UF-105. available from UNITIKA LTD.). The flocculated slurry was dewatered and collected on an 80-mesh screen in the paper machine (available from Kumagaya Riki Industries Co., Ltd.). The wet mat was dried and pressed at 140° C. and a pressure of 50 Kg/cm², and then cooled to obtain a fiber reinforced composite. The composite was evaluated with flexural strength and impact strength and the results are shown in Table 1.

EXAMPLE 2

An aqueous slurry was prepared by dispersing 4 g of chopped glass fibers having an average length of 6 mm (UPDE-1/4-ZA508 available from Unitika UM Glass Co., Ltd.), 0.1 g of water-soluble organic polymers charged minus in water (UF-313 available from Unitika Ltd.), 4 g of self-curable phenol resin particles (UNIVEKS N-type available from Unitika Ltd.) in 10 liter of water. The slurry was flocculated with a dilute, plus charged aqueous solution containing 0.1 g(in 30 g water) of water soluble organic polymer(UF-105. available from UNITIKA LTD.). The flocculated slurry was dewatered and collected on an 80-mesh screen in the paper machine (available from Kumagaya Riki Industries Co., Ltd.). The wet mat was dried and pressed at 170° C. and a pressure of 80 Kg/cm² for 15 minutes and then cooled to obtain a fiber reinforced composite. The composite was evaluated with flexural strength and impact strength and the results are shown in Table 1.

EXAMPLE 3

A fiber reinforced composite was prepared as generally described in Example 1 with the exception that the reinforcing fibers were changed to chopped glass fibers having an average length of 12 mm (UPDE-1/2-ZA508 available from Unitika UM Glass Co., Ltd.). The same data are shown in Table 1.

EXAMPLE 4

A fiber reinforced composite was prepared as generally described in Example 1 with the exception that the reinforcing fibers were changed to carbon fibers having an average length of 6 mm (HTA-C6-PL available from Toho Rayon Co., Ltd.). The same data are shown in Table 1.

EXAMPLE 5

An aqueous slurry was prepared by dispersing 4 g of chopped glass fibers having an average length or 6 mm (UPDE-1/4-ZA508 available from Unitika UM Glass Co., Ltd.), 0.1 g of water-soluble organic polymers charged minus in water (UP-313 available from Unitika Ltd.), 0.3 g of a latex which is electrically neutral and has no charge in water (Bon Coat R-3340 available from Dainippon Ink & Chemicals Inc.) and 4 g of polyethylene particles (PE-COMP 1407 available from Toyo Ink Mfg. Co., Ltd.) in 10 liter of water. The slurry was flocculated with a dilute, plus charged aqueous solution containing 0.1 g(in 30 g water) of water soluble organic polymer(UF-105. available from UNITIKA LTD.). The flocculated slurry was dewatered and collected on an 80-mesh screen in the paper machine (available from Kumagaya Riki Industries Co., Ltd.). The wet mat was dried and pressed at 140° C. and a pressure of 50 Kg/cm$^2$, and then cooled to obtain a fiber reinforced composite. The composite was evaluated with flexural strength and impact strength and the results are shown in Table 1.

EXAMPLE 6

A fiber reinforced composite was prepared as generally described in Example 5 with the exception that self-curable phenol resin particles (Univeks N-type available from Unitika Ltd,) was employed instead of the polyethylene resin particles and pressing was conducted at 170° C. and 100 Kg/cm$^2$ for 15 minutes. The same data are shown in Table 1.

EXAMPLE 7

A fiber reinforced composite was prepared as generally describers in Example 5 with the exception that the reinforcing fibers were changed to chopped glass fibers having an average length of 12 mm (UPDE-1/2-ZA508 available from Unitika UM Glass Co., Ltd,). The same data are shown in Table 1.

EXAMPLE 8

A fiber reinforced composite was prepared as generally described in Example 5 with the exception that the reinforcing fibers were changed to chopped carbon fibers having an average length of 6 mm (HTA-c6-PL available from Toyo Rayon Co., Ltd.). The same data are shown in Table 1.

COMPARATIVE EXAMPLE 1

An aqueous slurry was prepared by disparsing 4 g of chopped glass fibers having an average length of 6 mm (UPDE-1/4-ZA508 available from Unitika UM Glass Co., Ltd.), 0.1 g of a latex charged minus in water (Bon Coat 3218 available from Dainippon Ink & Chemicals Inc.) and 4 g of polyethylene particles (PE-COMP 1407 available from Toyo Ink Mfg. Co., Ltd.) in 10 liter of water. The slurry was flocculated with a dilute, plus charged aqueous solution containing 0.1 g(in 30 g water) of water soluble organic polymer(UF-105. available from UNITIRA LTD.). The flocculated slurry was dewatered and collected on an 80-mesh screen in the paper machine (available from Kumagaya Riki Industries Co., Ltd.). The wet mat was dried and pressed at 140° C. and a pressure of 50 Kg/cm$^2$, and then cooled to obtain a fiber reinforced composite. This process follows with Japanese Kokoku Publication 1-20644. The composite cas evaluated with flexural strength and impact strength and the results are shown in Table 1.

COMPARATIVE EXAMPLE 2

An aqueous slurry was prepared by dispersing 4 g of chopped glass fibers having an average length or 6 mm (UPDE-1/4-ZA508 available from Unitika UM Glass Co., Ltd.), 0.1 g of a latex charged minus in water (Bon Coat 3218 available from Dainippon Ink & Chemicals Inc.) and 4 g of self-curable phenol resin particles (UNIVEKS N-type available from Unitika Ltd.) in 10 liter of water. The slurry was flocculated with a dilute, plus charged aqueous solution containing 0.1 g(in 30 g water) of water soluble organic polymer(UF-105. available from UNITIKA LTD.). The flocculated slurry was dewatered and collected on an 80-mesh screen in the paper machine (available from Kumagaya Riki industries Co., Ltd.). The Wet mat was dried and pressed at 170° C. and a pressure of 80 Kg/cm$^2$ for 15 minutes and then cooled to obtain a fiber reinforced composite. The process follows with Japanese Kokai Publication 1-211343. The composite was evaluated with flexural strength and impact strength and the results are shown in Table 1.

TABLE 1

| Ex. No. | Flexural strength (Kg/cm$^2$) | Izot Impact Strength with Noch (Kgcm/cm) |
|---|---|---|
| 1 | 31 | No rupture |
| 2 | 32 | 25 |
| 3 | 38 | No rupture |
| 4 | 41 | 15 |
| 5 | 32 | No rupture |
| 6 | 33 | 25 |
| 7 | 40 | No rupture |
| 8 | 43 | 16 |
| Comp. Ex. | | |
| 1 | 15 | 40 |
| 2 | 14 | 8 |

EXAMPLE 9

An aqueous slurry was prepared by dispersing 4 g of chopped glass fibers having an average length of 6 mm (UPDE-1/4-ZA508 available from Unitika UM Glass Co., Ltd.), 0.1 g of water-soluble organic polymers charged minus in water (UF-105 available from Unitilca Ltd.) and 4 g of polyethylene particles (PE-COMP 1407 available from Toyo Ink Mfg. Co., Ltd.) in 10 liter of water. The slurry was flocculated with a dilute, plus charged aqueous solution containing 0.1 g(in 30 g water) of water soluble organic polymer(UF-505. available from UNITIKA LTD.). The flocculated slurry was shaped sheet using a rectangular sheet machine (available from Kumagai Riki Kogyo K.K.), and then dewatered. The wet mat was dried and pressed at 140° C. and a pressure of 50 Kg/cm$^2$, and then cooled to obtain a fiber reinforced composite. The composite had a flexural strength of 32 Kg/mm$^2$.

EXAMPLE 10

An aqueous slurry was prepared by dispersing 4 g of chopped glass fibers having an average length of 6 mm (UPDE-1/4-ZA508 available from Unitika UM Glass Co., Ltd.), 0.1 g of water-soluble organic polymers charged minus in water (Uniflocker UF-105 available from Unitika Ltd.), 4 g of self-curable phenol resin particles (UNIVEKS N-type available from Unitika Ltd.) in 10 liter of water. The slurry was flocculated with a dilute, plus charged aqueous solution containing 0.1 g (in 30 g water) of water soluble organic polymer having a molecular weight of 3,000

(uniflocker UF-505 available from UNITIKA LTD.). The flocculated slurry was shaped sheet using a rectangular sheet machine (available from Kumagai Riki Kogyo K.K.). The wet mat was dried and pressed at 170° C. and a pressure of 80 Kg/cm² for 15 minutes and then cooled to obtain a fiber reinforced composite. The composite had a flexural strength of 34 Kg/cm².

EXAMPLE 11

A fiber reinforced composite was prepared as generally described in Example 9 with the exception that the reinforcing fibers were changed to chopped glass fibers having an average length of 12 mm (UPDE-1/2-ZA508 available from Unitika UM Glass Co., Ltd.). The obtained composite had a flexural strength of 40 Kg/cm².

EXAMPLE 12

A fiber reinforced composite was prepared as generally described in Example 10 with the exception that the reinforcing fibers were changed to carbon fibers having an average length of 6 mm (HTA-C6-PL available from Toho Rayon Co., Ltd.). The obtained composite had a flexural strength of 43 Kg/cm²

PREPARATION EXAMPLE 1

A one liter reaction vessel was charged with 20 g of aniline and 500 g of a 5.5N $H_2SO_4$ solution to form a solution. To the content, 200 g of an aqueous solution of 20 g of ammonium persulfate was added dropwise over 30 minutes at 5° C. and then mixed at 5° C. for another 2 hours. The obtained dark green precipitation was filtered and rinsed with methanol. It was then separated and vacuum-dried at 30° C. for 12 hours to obtain 8 g of polyaniline powder.

EXAMPLE 13

An aqueous slurry was prepared by dispersing 5 g of the electroconductive polymer obtained in Preparation Example 1, 0.5 g of polyester fibers (Melty available from Unitika Ltd.), 0.1 g of water-soluble organic polymers charged minus in water (UF-105 available from Unitika Ltd.), in 2 liter of water, and then mixing for 5 minutes. The slurry was flocculated with a dilute, plus charged aqueous solution containing 0.1 g (in 30 g water) of water soluble organic polymer having a molecular weight of 3,000 (UF-505. available from UNITIRA LTD.). The flocculated slurry was dewatered and shaped sheet by the sheet machine (available from Kumagaya Riki Kogyo K.K.). The wet mat was dewatered and dried at 120° C. and then pressed at 100 Kg/cm² for 60 seconds to obtain an electroconductive sheet having a thickness of 0.8 mm, an electroconductivity of 2 at 25° C. and a flexural strength of 6 Kg/cm².

What is claimed is:

1. A process for producing a fiber reinforced composite consisting essentially of:

preparing an aqueous slurry which consists essentially of reinforcing fibers selected from the group consisting of glass fibers and carbon fibers uniformly dispersed therein, a latex which is electrically neutral and has no charge, water-soluble organic polymers A as dispersing agents charged in water and particulate organic thermosetting polymers, adding thereto water-soluble organic polymers B as flocculating agents charged opposite to said organic polymers A in water to flocculate the aqueous slurry, dewatering and drying the slurry and molding the dried product, said polymers A being present in composite in an amount of 0.1 to 10% by weight, polymers B being added in an amount of 0.1 to 10% by weight, the amount of electrically neutral latex being present in an amount of 0.1 to 10% by weight, the particulate organic thermosetting polymers being present in an amount of 10% to 90% by weight, and the reinforcing fibers are present in an amount of 10 to 90% by weight, all based upon the weight of the composite, wherein said polymers A and B are selected from polymers charged minus in water, and polymers charged plus in water, wherein said polymers charred minus in water are selected from the group consisting of partially hydrolyzed polyacrylamide, poly(sodium acrylate) and partially hydrolyzed polyacrylonitrile, and said polymers charged plus in water are selected from the group consisting of a modified cationic polyacrylamide, a dialkylaminoethyl methacrylate polymer, a vinylimidazoline polymer and a diarylamine polymer.

2. The process according to claim 1 wherein said reinforcing fibers have an average length of 0.1 to 50 mm.

3. The process according to claim 1 wherein said reinforcing fibers have an aspect ratio of fiber length/fiber diameter of at least 40.

4. The process according to claim 1 wherein said polymers A and B have film-forming ability at room temperature or less.

5. The process according to claim 1 wherein said particulate organic thermosetting polymers nave a particle size of 10 to 300 micrometer.

6. The process according to claim 1 wherein said aqueous slurry further contains an inorganic filler, a pigment, a dye, an ultraviolet stabilizer, an antioxidant, a foaming agent, a defoamer, a bactericide or an electromagnetic wave absorbent.

7. The process according to claim 1 wherein the reinforcing fibers are glass fibers.

* * * * *